(12) United States Patent
Steves et al.

(10) Patent No.: US 11,008,503 B2
(45) Date of Patent: May 18, 2021

(54) WATER-IN-OIL HYDRAULIC FRACTURING FLUID AND METHOD OF USING SUCH

(71) Applicant: Indorama Ventures Oxides LLC, The Woodlands, TX (US)

(72) Inventors: Robert Carl Steves, The Woodlands, TX (US); John H. Clements, The Woodlands, TX (US); David C. Lewis, The Woodlands, TX (US)

(73) Assignee: INDORAMA VENTURES OXIDES LLC, The Woodlands, TX (US)

( * ) Notice: Subject to any disclaimer, the term of this patent is extended or adjusted under 35 U.S.C. 154(b) by 0 days.

(21) Appl. No.: 16/499,633

(22) PCT Filed: Apr. 24, 2018

(86) PCT No.: PCT/US2018/029001
§ 371 (c)(1),
(2) Date: Sep. 30, 2019

(87) PCT Pub. No.: WO2018/200432
PCT Pub. Date: Nov. 1, 2018

(65) Prior Publication Data
US 2020/0115623 A1 Apr. 16, 2020

Related U.S. Application Data

(60) Provisional application No. 62/489,014, filed on Apr. 24, 2017.

(51) Int. Cl.
*C09K 8/64* (2006.01)
*E21B 43/26* (2006.01)
*C09K 8/60* (2006.01)
*C09K 8/80* (2006.01)
*E21B 47/12* (2012.01)

(52) U.S. Cl.
CPC ............. *C09K 8/64* (2013.01); *C09K 8/602* (2013.01); *C09K 8/80* (2013.01); *E21B 43/26* (2013.01); *E21B 47/12* (2013.01)

(58) Field of Classification Search
None
See application file for complete search history.

(56) References Cited

U.S. PATENT DOCUMENTS

| | | |
|---|---|---|
| 2,999,063 A | 9/1961 | Hoeppel |
| 3,710,865 A | 1/1973 | Kiel |
| 3,977,472 A | 8/1976 | Graham et al. |
| 4,614,435 A | 9/1986 | McIntire |
| 4,671,665 A | 6/1987 | McIntire |
| 4,802,141 A | 1/1989 | Stegemoeller et al. |
| 4,850,701 A | 7/1989 | Stegemoeller et al. |
| 4,886,367 A | 12/1989 | Bragg et al. |

(Continued)

OTHER PUBLICATIONS

International Search Report and Written Opinion received in corresponding PCT Application No. PCT/US2018/029001, dated Jul. 20, 2018.

*Primary Examiner* — Andrew Sue-Ako

(57) ABSTRACT

A hydraulic fracturing fluid comprising a water-in-oil emulsion comprising (i) an aqueous solution, (ii) an oil, (iii) a first surfactant, and, optionally, (iv) at least one secondary surfactant selected from an emulsifying surfactant and/or a phosphate ester of ethoxylated alcohol or alkylphenol, and methods of making and using the same.

20 Claims, 3 Drawing Sheets

(56) References Cited

U.S. PATENT DOCUMENTS

| | | | |
|---|---|---|---|
| 4,919,540 | A | 4/1990 | Stegemoeller et al. |
| 5,663,220 | A | 9/1997 | Tokura et al. |
| 6,035,936 | A | 3/2000 | Whalen |
| 6,291,406 | B1 | 9/2001 | Rose et al. |
| 6,770,603 | B1* | 8/2004 | Sawdon ............... C09K 8/36 507/140 |
| 6,806,233 | B2 | 10/2004 | Patel |
| 7,205,263 | B2 | 4/2007 | Chatterji et al. |
| 7,527,097 | B2 | 5/2009 | Patel |
| 2001/0051593 | A1* | 12/2001 | Patel ............... C09K 8/32 507/129 |
| 2004/0147404 | A1* | 7/2004 | Thaemlitz ............ C09K 8/26 507/100 |
| 2011/0174485 | A1* | 7/2011 | Robb ............... C09K 8/685 166/270.1 |

* cited by examiner

WATER-IN-OIL HYDRAULIC FRACTURING FLUID AND METHOD OF USING SUCH

CROSS-REFERENCE TO RELATED APPLICATIONS

This application is the National Phase of International Application PCT/US2018/0029001 filed Apr. 24, 2018 which designated the U.S. and which claims priority to U.S. App. Ser. No. 62/489,014 filed Apr. 24, 2017. The noted applications are incorporated herein by reference.

STATEMENT REGARDING FEDERALLY SPONSORED RESEARCH OR DEVELOPMENT

Not applicable.

FIELD

The present disclosure generally relates to a hydraulic fracturing fluid comprising a water-in-oil emulsion comprising (i) an aqueous solution, (ii) an oil, (iii) a first surfactant, and, optionally, (iv) at least one secondary surfactant selected from an emulsifying surfactant and/or a phosphate ester of ethoxylated alcohol or alkylphenol. Additionally, the present disclosure relates to a method of making and using the hydraulic fracturing fluid.

BACKGROUND

Hydraulic fracturing is a method of stimulating the production of an oil or gas well by which fluid (i.e., "hydraulic fracturing fluid") is pumped downhole at high flow rates to create downhole pressures capable of fracturing the rock face. So-called hydraulic fractures are created that propagate outward from the wellbore, providing a path for oil and gas to flow.

The fractures that form under the action of high fluid pressure rapidly close once pumping ceases and pressure drops. As such, the fluids employed in hydraulic fracturing are designed to carry and deposit small particles known as proppant into the newly created fractures preventing them from fully closing.

Early fracturing operations employed oil-based fluids. However, most fluids in use today are water-based because of the large volumes (60,000-1,000,000 gallons per well) and costs involved. Various other types of fluids have been used as hydraulic fracturing fluids, including polymer-free hydraulic fracturing fluids containing viscoelastic surfactants (VES), oil-in-water ("O/W") emulsions, and water-in-oil ("W/O") emulsions. However, water-in-oil emulsions are generally more cost-effective than oil-in-water emulsions.

U.S. Pat. No. 6,291,406 demonstrates stable sand-bearing water-in-oil emulsions consisting of about 90% water, 8-9% oil and 1% surfactants, wherein said surfactants comprise alkylamines or amineoxides such as the two-mole ethoxylates of erucyl and oleyl amines, optionally, in combination with long-chain alkylaryl or diphenylether sulfonates.

U.S. Pat. Nos. 6,806,233 and 7,527,097 teach the preparation of water-in-oil emulsions for use in both drilling and hydraulic fracturing applications that feature 2-3 mole ethoxylates of tallow and soya-based amines. The emulsions of the inventions were prepared as low viscosity mixtures that became stable water-in-oil emulsions, as demonstrated by measurement of electrical stability, with viscosities sufficient to support proppant on aging for 16 hours at 150-250° C. It was further demonstrated that said emulsions could be "broken" on neutralization of the aforementioned amines by addition of HCl to yield low viscosity oil-in-water emulsions. It was also demonstrated that lime could be added to the broken, neutralized emulsions of the inventions effectively regenerating the original water-in-oil formulations.

Despite the state of the art, there is a continuous need for the development of alternative water-in-oil-based hydraulic fracturing fluids.

FIGURES

DETAILED DESCRIPTION

Figure 1:
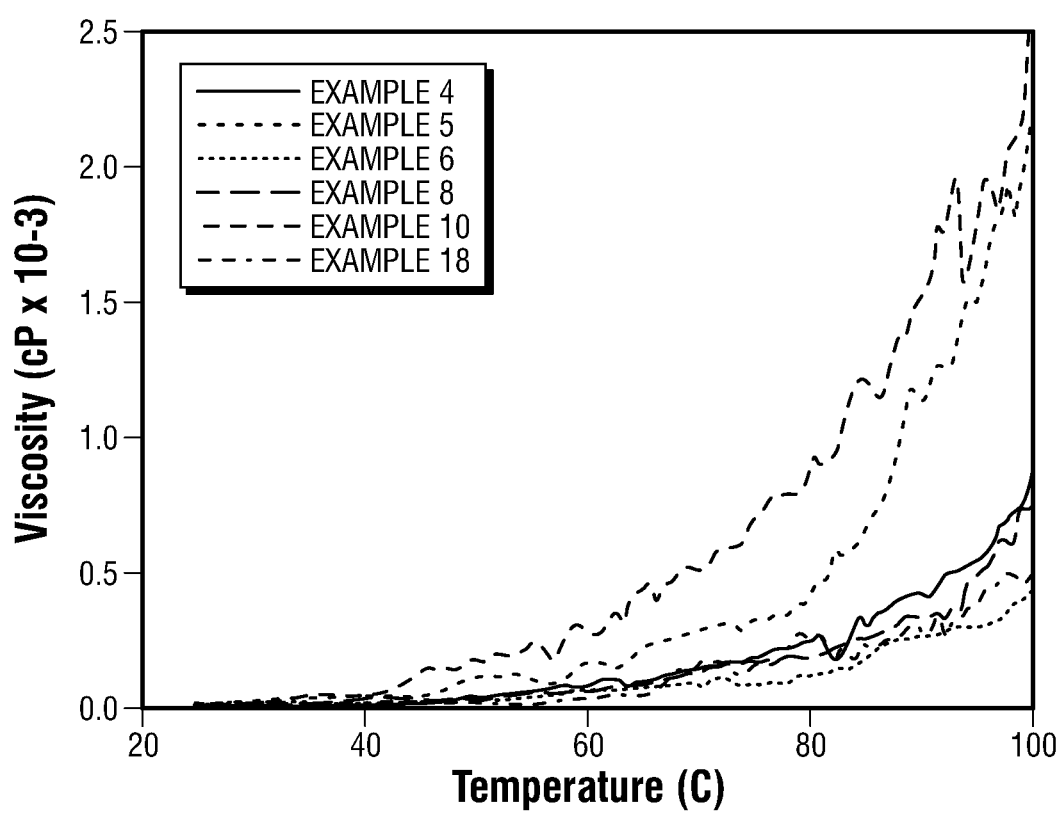
FIG. 1 is a graphical representation of rheological temperature scans of water-in-oil emulsions using a rheometer at a constant shear rate of 50 $s^{-1}$ while increasing the temperature of the emulsions from 25 to 100° C. at a rate of 2° C./minute.

Before explaining at least one embodiment of the present disclosure in detail, it is to be understood that the present disclosure is not limited in its application to the details of construction and the arrangement of components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y. Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the term "and combinations thereof" when used with the phrase "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt %", "weight percentage", or "percentage by weight" are used interchangeably.

The phrase "substantially free" shall be used herein to mean present in an amount less than 1 weight percent, or less than 0.1 weight percent, or less than 0.01 weight percent, or alternatively less than 0.001 weight percent, based on the total weight of the referenced composition.

The phrase "subterranean formation" encompasses both areas below exposed earth and areas below earth covered by water, such as an ocean or fresh water.

The term "alkyl" is inclusive of both straight chain and branched chain groups and of cyclic groups. In some embodiments, the alkyl group may have up to 40 carbons (in some embodiments up to 30, 20, 15, 12, 10, 8, 7, 6, 5, 4, 3, 2, or 1 carbons) unless otherwise specified. Cyclic groups can be monocyclic and in some embodiments, can have from 3 to 10 carbon atoms.

Unless otherwise specified, the reaction conditions disclosed herein are intended to be at atmospheric pressure, i.e., about 101 kPa.

According to one aspect, the present disclosure is directed to a hydraulic fracturing fluid for treating subterranean formations.

In one embodiment, the hydraulic fracturing fluid comprises a water-in-oil emulsion comprising an aqueous solution, an oil, and a first surfactant.

The aqueous solution can comprise sea water, freshwater, naturally-occurring and/or artificially-created brines containing organic and/or inorganic dissolved salts, liquids comprising water-miscible organic compounds, or combinations thereof.

Non-limiting examples of suitable brines include chloride-based, bromide-based, or formate-based brines containing monovalent and/or polyvalent cations and combinations thereof. Examples of suitable chloride-based brines include, but are not limited to, sodium chloride, potassium chloride, cesium chloride, magnesium chloride, barium chloride, and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate. Additional examples of suitable brines include carbonates and bicarbonates.

In one particular embodiment, the aqueous solution is a brine solution comprising water and calcium chloride.

In one embodiment, the concentration of salts in the naturally-occurring or artificially-created brines is greater than or equal to 3.5 wt % of the brine.

The oil can comprise one or more oils chosen from, for example but without limitation, linear, branched, and/or cyclic hydrocarbons. Non-limiting examples of the oil include diesel oil, jet fuel, mineral oil, biodiesel, vegetable oil, animal oil, paraffin oil, white oil, kerosene, internal olefins, hydrogenated oil, alpha olefins, dialkyl carbonates, and/or mixtures thereof.

The first surfactant is at least one of:

(a) a 4-mole or higher ethoxylate of a fatty amine represented by formula I:

wherein $R^1$ is a saturated or unsaturated, branched or straight chain, substituted or unsubstituted hydrocarbyl group having from 12 to 18 carbon atoms; and

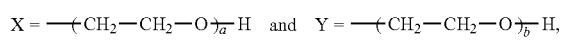

wherein a and b are each integers independently ranging from 2 to 15, or from 2 to 8, or from 2 to 4;

(b) an ethoxylate of 1,3-diaminopropyl derivative of a fatty amine represented by formula II:

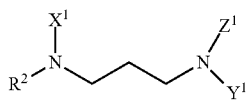

wherein $R^2$ is a saturated or unsaturated, branched or straight chain, substituted or unsubstituted hydrocarbyl group having from 12 to 18 carbon atoms; and

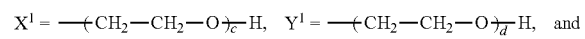

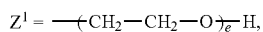

wherein c, d, and e are each integers independently ranging from 1 to 10, or from 1 to 6, or from 1 to 3; and (c) an ethoxylate of an amine derived from linear alcohol propoxylate represented by formula III:

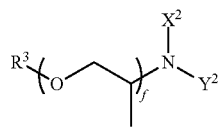

wherein $R^3$ is a saturated or unsaturated, branched or straight chain, substituted or unsubstituted hydrocarbyl group having from 6 to 18 carbon atoms; f is an integer ranging from 1 to 10, or from 1 to 8, or from 1 to 5; and

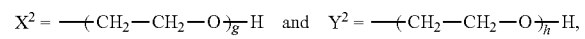

wherein g and h are each integers independently ranging from 1 to 15, or 1 to 8, or 1 to 4.

According to another embodiment, the water-in-oil emulsion further comprises at least one secondary surfactant selected from (a) an emulsifying surfactant, and/or (b) a phosphate ester of ethoxylated alcohol or alkylphenol represented by structure IV:

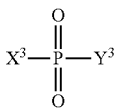

wherein

wherein k is an integer ranging from 1 to 20, or from 1 to 10, or from 1 to 6, and R is a saturated or unsaturated, branched or straight chain, substituted or unsubstituted hydrocarbyl group having from 4 to 14 carbon atoms, alkylbenzene, or dialkylbenzene; and $Y^3$ is —H or —$X^3$.

In one embodiment, the emulsifying surfactant is at least one of:

(a) an imidazoline represented by formula V:

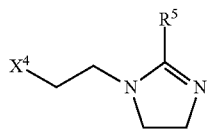

wherein $X^4$ is one of the following: —OH, —$NH_2$,

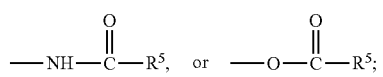

and $R^5$ is a saturated or unsaturated, branched or straight chain, substituted or unsubstituted hydrocarbyl group having from 9 to 17 carbon atoms, (b) an amidoamine represented by formula VI:

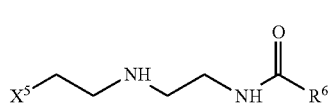

wherein $X^5$ is one of the following: —OH, —$NH_2$,

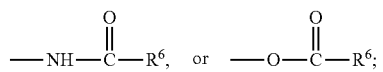

and $R^6$ is a saturated or unsaturated, branched or straight chain, substituted or unsubstituted hydrocarbyl group having from 9 to 17 carbon atoms, and (c) a hydroxyalkyl carbamate represented by formula VII:

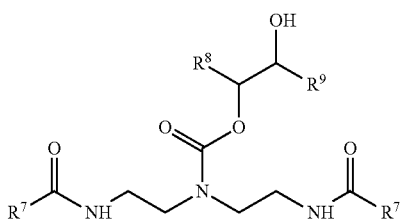

wherein $R^7$ is a saturated or unsaturated, branched or straight chain, substituted or unsubstituted hydrocarbyl group having from 9 to 17 carbon atoms, and $R^8$ and $R^9$ are one of the following: (i) $R^8=R^9=-H$, (ii) $R^8=-H$ and $R^9=-CH_2OH$, (iii) $R^8=-CH_2OH$ and $R^9=-H$, (iv) $R^8=-H$ and $R^9=-CH_3$, (v) $R^8=-CH_3$ and $R^9=-H$, (vi) $R^8=-H$ and $R^9=-C_2H_5$, or (vii) $R^8=-C_2H_5$ and $R^9=-H$.

The water-in-oil emulsion can further comprise at least one of a pH modifier, wetting agent, additional brine, and/or additional dispersants or stabilizers.

In one embodiment, the water-in-oil emulsion further comprises a pH modifier.

The pH modifier can be any basic compound such as, for example, one or more alkali salts. Non-limiting examples of alkali salts include alkali hydroxides, alkali carbonates, and alkali bicarbonates. In one embodiment, the pH modifier is one or more of calcium hydroxide, calcium carbonate, and/or calcium bicarbonate. In one particular embodiment, the pH modifier is lime.

In one embodiment, the water-in-oil emulsion comprises (a) the aqueous solution in an amount ranging from about 40 to about 90 wt %, or from about 70 to about 90 wt %, or from about 80 to about 90 wt %; (b) the oil in an amount ranging from about 5 to about 55 wt %, or from about 5 to about 30 wt %, or from about 10 to about 20 wt %; (c) the pH modifier in an amount ranging from 0 to about 2 wt %; (d) the first surfactant in an amount ranging from about 0.5 to about 3 wt %; and, optionally, (e) an emulsifying surfactant (as described above) in an amount ranging from 0 to about 3 wt % and/or a phosphate ester of ethoxylated alcohol or alkylphenol (as described above) in an amount ranging from 0 to about 3 wt %.

In another embodiment, the water-in-oil emulsion comprises: (a) the aqueous solution in an amount ranging from about 40 to about 90 wt %, or from about 70 to about 90 wt %, or from about 80 to about 90 wt %; (b) the oil in an amount ranging from about 5 to about 55 wt %, or from about 5 to about 30 wt %, or from about 10 to about 20 wt %; (c) the pH modifier in an amount ranging from greater than 0 to about 2 wt %; (d) the first surfactant in an amount ranging from about 0.5 to about 3 wt %; and, optionally, (e) an emulsifying surfactant (as described above) in an amount ranging from greater than 0 to about 3 wt % and a phosphate ester of ethoxylated alcohol or alkylphenol (as described above) in an amount ranging from greater than 0 to about 3 wt %.

The hydraulic fracturing fluid can further comprise at least one of a barite weight agent, organoclays, fluid loss control agents, rheology modifiers, and/or combinations thereof.

In one embodiment, the hydraulic fracturing fluid further comprises a proppant. Non-limiting examples of the proppant include untreated sand, treated sand, and ceramic proppants such as, for example, sintered bauxite, zirconium oxide, kaolin, magnesium silicate, or blends thereof. Treated sand includes sand that has been coated with, for example, epoxy resins, furan, polyesters, vinyl esters, and polyurethanes. The ceramic proppants can also be coated with, for example, epoxy resins, furan, polyesters, vinyl esters, and polyurethanes to create a coated ceramic proppant.

The proppant can range in size between 100 microns to 2,500 microns. Depending on the subterranean formation to be treated, the proppant can be present in the hydraulic fracturing fluid in a concentration ranging from 1 to 20 lbs. of proppant per gallon of the hydraulic fracturing fluid. As would be understood by one of ordinary skill in the art, the amount of proppant can vary depending on the stage of the fracturing process.

The hydraulic fracturing fluid can be blended by any number of mechanical means as would be known to a person of ordinary skill in the art during which a portion of the mechanical energy imparted during blending may be converted to heat, warming the hydraulic fracturing fluid to a temperature up to 50° C. The resulting hydraulic fracturing fluid can have a viscosity up to 500 cP at 50° C. when measured at a constant shear rate of 50 $s^1$, but can still be pumped due to the hydraulic fracturing fluid's shear-thinning properties.

In one embodiment, the amount of the first surfactant and/or the amount of the at least one secondary surfactant can be adjusted to modify the viscosity of the hydraulic fracturing fluid at different temperatures and conditions.

The hydraulic fracturing fluid can be formed by (i) combining the oil with the first surfactant and, optionally, the at least one secondary surfactant to form an oil-based solution, and (ii) blending the oil-based solution with the aqueous solution to form a water-in-oil emulsion, and, optionally, (iii) mixing one or more proppants with the water-in-oil emulsion.

The aqueous solution can include one or more pH modifiers and/or additional water soluble additives. Alternatively, the aqueous solution can be mixed with a pH modifier and/or additional water soluble additives before the blending step.

The hydraulic fracturing fluid can also be formed by (i) blending the oil, the aqueous solution, the pH modifier, the first surfactant, and, optionally, the at least one secondary surfactant to form the water-in-oil emulsion, and, optionally, (ii) mixing one or more proppants with the water-in-oil emulsion.

The blending step may be carried out by continuous-in-line mixers such as described in U.S. Pat. No. 5,663,220. Preferably, the agitation is sufficient such that the aqueous liquid will form droplets having an average diameter from about 0.01 to about 100 microns, or from about 1 to about 50 microns.

In one embodiment, the water-in-oil emulsion is heated to a temperature of at least 50° C., or at least 60° C., or at least 70° C., or at least 80° C. before adding the one or more proppants. In one particular embodiment, the water-in-oil emulsion is heated to a temperature between 50° C. to 80° C. before adding the proppant.

In general, the hydraulic fracturing fluid is prepared above ground prior to its injection into a well bore or a subterranean formation, although it is contemplated that the emulsions can be formed in the well bore or at another location within the formation.

If used, the proppant is generally added after the step of blending the oil-based solution with the aqueous solution. Any method which distributes and suspends the proppant in the composition can be employed, e.g., using mixer equipment described in such patents as U.S. Pat. Nos. 4,614,435, 4,671,665, 4,886,367, 4,802,141, 4,850,701 and 4,919,540, the teachings of which are incorporated herein by reference. The properties of the resulting hydraulic fracturing fluid containing the proppant may depend on the method of addition. In one method for adding the proppant, a high shear mixer such as a PODrM blender (U.S. Pat. Nos. 4,614,435 and 4,671,665) can be employed. Alternatively, the proppant can be mixed with the emulsion mixture using equipment which does not generate such high shear rates.

In another aspect, the present disclosure is directed to a method by which the water-in-oil emulsion in the hydraulic fracturing fluid can be changed to an oil-in-water emulsion.

In one embodiment, an acid is added to the above-described hydraulic fracturing fluid such that the water-in-oil emulsion therein is destabilized, resulting in a partial or complete oil-in-water emulsion (i.e., a "broken hydraulic fracturing fluid"). The broken hydraulic fracturing fluid has a viscosity that approaches water, thereby allowing the hydraulic fracturing fluid to flow back to the surface and, potentially, be recycled. Without intending to be held to a particular theory, it is thought that the acid neutralizes, or at least partially neutralizes, the first surfactant and/or the at least one secondary surfactant causing the water-in-oil emulsion to be destabilized so as to form an oil-in-water emulsion.

The acid added to the hydraulic fracturing fluid to destabilize the water-in-oil emulsion to form an oil-in-water emulsion can be an encapsulated or non-encapsulated acid. The acid can be a strong acid, such as inorganic acids, or weak acids, such as carboxylic acids. Non-limiting examples of the acid include lactic acid, acetic acid, sulfuric acid, nitric acid, hydrochloric acid, and phosphoric acid.

In an additional embodiment, a base is added to the broken hydraulic fracturing fluid such that the oil-in-water emulsion is turned back to a water-in-oil emulsion. The base can be any basic compound including alkali salts such as alkali hydroxides, alkali carbonates, or alkali bicarbonates. In one embodiment, the base comprises calcium hydroxide, calcium carbonate, and/or calcium bicarbonate. In one particular embodiment, the base is lime. In another embodiment, the base is added in combination with an emulsifying surfactant as described above. One non-limiting example of such an emulsifying surfactant is SURFONIC® OFC 100 emulsifying surfactant available from Huntsman Corp. or affiliates.

The presently disclosed hydraulic fracturing fluid can generally be employed using conventional well treatment techniques.

In one embodiment, the presently disclosed hydraulic fracturing fluid containing proppant is prepared above ground and then pumped into the well bore and flowed to the desired location in the subterranean formation using techniques well-known in the art. Once a formation has been fractured and at least a portion of the proppant in the hydraulic fracturing fluid has been placed in the fracture, the hydraulic fracturing fluid can be removed from the formation and the well bore.

In a further aspect, the present disclosure is directed to method of providing a well-specific hydraulic fracturing fluid, the method comprising: (a) providing a hydraulic fracturing fluid comprising the water-in-oil emulsion as described herein, (b) determining the conditions of a subterranean formation, and (c) adjusting the ratios of the first surfactant and/or the at least one secondary surfactant depending on the conditions of the subterranean formation.

In one embodiment, the proppant can be included in the hydraulic fracturing fluid provided in step (a). In another embodiment, the proppant can be added to the hydraulic fracturing fluid after steps (b) and/or (c).

In a further aspect, the present disclosure is directed to a method of providing a well-specific hydraulic fracturing fluid comprising: (a) preparing the water-in-oil emulsion as described herein, (b) determining the conditions of a subterranean formation, (c) adjusting the ratios of the first surfactant and/or the at least one secondary surfactant depending on the conditions of the subterranean formation, and (d) mixing one or more proppants with the water-in-oil emulsion to form a well-specific hydraulic fracturing fluid.

In one embodiment, the method further comprises injecting the well-specific hydraulic fracturing fluid into a subterranean surface.

In another aspect, the present disclosure is directed to a method of providing a well-specific hydraulic fracturing fluid comprising: (a) determining the conditions of a subterranean formation, (b) preparing the water-in-oil emulsion as described herein, wherein the amounts of the first surfactant and/or secondary surfactant are adjusted with respect to the conditions of the subterranean formation, and (c) mixing one or more proppants with the water-in-oil emulsion to form a well-specific hydraulic fracturing fluid.

In yet another aspect, the present disclosure is directed to a method for fracturing a subterranean formation comprising injecting any one of the embodiments of the hydraulic fracturing fluid disclosed herein into the formation at a pressure sufficient to fracture the formation.

EXAMPLES

Examples are provided below. However, the present disclosure is to be understood to not be limited in its application to the specific experiments, results, and laboratory procedures disclosed herein below. Rather, the Examples are simply provided as one of various embodiments and are meant to be exemplary and not exhaustive.

Examples of Water-in-Oil Emulsions

Exemplary water-in-oil emulsions were prepared by mixing brine (30 wt. % $CaCl_2$), oil, lime, and surfactants on a Hamilton Beach mixer for 30 minutes during which the temperature of the mixture increased to about 50° C. All ingredients were weighed and transferred to the Hamilton Beach mixer in no particular order and then blended together. The oil was Isopar™ M fluid (ExxonMobil). Three surfactants were used at varying concentrations as detailed in Table 1: (a) SURFONIC® T-5 surfactant (a 5-mol ethoxylate of tallow amine available from Huntsman Corp. or affiliates), (b) SURFONIC® OFC 100 emulsifying surfactant and corrosion inhibitor available from Huntsman Corp. or affiliates, and (c) a mixture of mono- and di-phosphate esters based on a C12-14 alcohol ethoxylate (referred to in the examples as "PE").

Twelve unique and six duplicate 300 mL samples of water-in-oil emulsions were prepared. Each sample comprised 82 wt. % brine, 14% Isopar™ M oil, 0.5% lime and 3.5% total surfactants. The surfactant concentrations for each sample fell within the following ranges: 0.5-1.5 wt. % SURFONIC® T-5 surfactant, 1.5-2.5 wt. % SURFONIC®

OFC 100 emulsifying surfactant, and 0-1.0% PE. The twelve unique and six duplicate compositions were selected using Design-Expert® software version 8.0.2 available from Stat-Ease Inc. (Minneapolis, Minn.). The Design-Expert® software was also used to create the ternary plots discussed below with data fitted to linear, quadratic, or modified quadratic models.

Viscosity and Electric Stability Analysis of Exemplary Water-in-Oil Emulsions

Viscosity as a function of temperature was recorded for each sample using a rheometer from Anton-Paar. Specially, a temperature scan was conducted using the rheometer at a constant shear rate of 50 s$^{-1}$ on each freshly prepared sample by recording viscosity every 21 seconds while increasing the temperature at a rate of 2° C./minute from 25 to 100° C. On heating, a water-in-oil emulsion forms with concomitant increase in viscosity. The lowest temperature required to achieve viscosities of 200, 300, 500 and 1,000 centipoise ("cP") is reported in Table 1 along with the percentages of each surfactant present. Additionally, freshly prepared samples were aged for 16 hours at 75° C. and electrical stability in peak volts was measured and reported in Table 1.

TABLE 2

| | Viscosity (cP) | | | | | |
|---|---|---|---|---|---|---|
| | 50° C. | | 70° C. | | 90° C. | |
| Sample # | 2 s$^{-1}$ | 50 s$^{-1}$ | 2 s$^{-1}$ | 50 s$^{-1}$ | 2 s$^{-1}$ | 50 s$^{-1}$ |
| 1 | 2010 | 52 | 9450 | 361 | 27600 | 2010 |
| 2 | 2860 | 44 | 16600 | 895 | 49600 | 2860 |
| 3 | 302 | 60 | 4530 | 199 | 9120 | 302 |
| 4 | 647 | 48 | 5320 | 211 | 15200 | 647 |
| 5 | 2320 | 109 | 12900 | 769 | 52000 | 2320 |
| 6 | 505 | 42 | 3660 | 149 | 8440 | 505 |
| 7 | 754 | 84 | 4250 | 227 | 16700 | 754 |
| 8 | 828 | 36 | 2400 | 90 | 14100 | 828 |
| 9 | 1200 | 103 | 7130 | 337 | 19700 | 1200 |
| 10 | 2620 | 166 | 22500 | 876 | 41100 | 2620 |
| 11 | 1610 | 56 | 17200 | 730 | 29700 | 1610 |
| 12 | 573 | 26 | 3140 | 171 | 13800 | 573 |
| 13 | 785 | 41 | 13600 | 529 | 24700 | 785 |
| 14 | 1530 | 57 | 8350 | 418 | 27900 | 1530 |
| 15 | 2190 | 51 | 12100 | 240 | 39200 | 2190 |
| 16 | 2540 | 63 | 16700 | 340 | 60300 | 2540 |
| 17 | 1920 | 65 | 10100 | 420 | 38200 | 1920 |
| 18 | 344 | 38 | 3920 | 222 | 8970 | 344 |

TABLE 1

| | Surfactant Concentration (wt %) | | | Temperature (° C.)[1] | | | | |
|---|---|---|---|---|---|---|---|---|
| Sample # | SURFONIC® T-5 Surfactant | SURFONIC® OFC 100 emulsifying surfactant | PE | 200 cP | 300 cP | 500 cP | 1000 cP | Electrical Stability (V) |
| 1 | 1 | 2 | 0.5 | 57.5 | 41.5 | 48.5 | 88.0 | 355 |
| 2 | 1 | 2.5 | 0 | 51.5 | 53.0 | 80.0 | 90.0 | 200 |
| 3 | 1.5 | 1.5 | 0.5 | 62.0 | 83.5 | 90.0 | >100 | 225 |
| 4 | 1 | 1.75 | 0.75 | 76.0 | 84.0 | 92.5 | >100 | 600 |
| 5 | 0.5 | 2 | 1 | 64.5 | 71.0 | 81.5 | 88.0 | 590 |
| 6 | 1.5 | 2 | 0 | 85.5 | 92.5 | >100 | >100 | 695 |
| 7 | 1 | 1.5 | 1 | 70.0 | 82.5 | 88.5 | >100 | 340 |
| 8 | 1.25 | 2 | 0.25 | 81.0 | 87.5 | 95.0 | >100 | 730 |
| 9 | 0.75 | 1.75 | 1 | 62.0 | 73.0 | 83.5 | 93.5 | 270 |
| 10 | 0.5 | 2.5 | 0.5 | 52.5 | 61.0 | 68.0 | 83.0 | 500 |
| 11 | 1.25 | 2.25 | 0 | 53.5 | 65.0 | 75.5 | 96.0 | 185 |
| 12 | 1.5 | 1.5 | 0.5 | 73.5 | 84.0 | 96.0 | >100 | 375 |
| 13 | 1 | 2.5 | 0 | 62.0 | 66.5 | 82.5 | 88.5 | 280 |
| 14 | 1 | 1.5 | 1 | 70.5 | 77.0 | 89.0 | >100 | 85 |
| 15 | 1 | 2 | 0.5 | 75.0 | 82.0 | 90.0 | 98.5 | 165 |
| 16 | 0.5 | 2.5 | 0.5 | 70.0 | 74.0 | 80.5 | 87.5 | 95 |
| 17 | 0.5 | 2 | 1 | 77.5 | 83.0 | 86.5 | >100 | 385 |
| 18 | 1.5 | 1.75 | 0.25 | 77.5 | 89.0 | >100 | >100 | 650 |

[1]Entries of ">100" denote samples that did not achieve the particular viscosity in that column at any point in the scan from 25 to 100° C.

Samples 4, 5, 6, 8, 10, and 18 all demonstrated an electrical stability of 500 V or greater after being aged for 16 hours at 75° C. FIG. 1 is a graphical representation of the above-described temperature scan for samples 4, 5, 6, 8, 10, and 18 of Table 1 obtained using the rheometer at a constant shear rate of 50 s$^{-1}$ and recording the measured viscosity every 21 seconds while increasing the temperature at a rate of 2° C./minute from 25 to 100° C.

Additionally, shear scans (shear sweeps) were conducted on fresh water-in-oil emulsions corresponding to samples 1-18. The shear scans were carried out at temperatures ranging from 50 to 100° C. at 10° C. increments with viscosity measurements being taken every 5 seconds while increasing the shear rate from 2 s$^{-1}$ to 100 s$^{-1}$. Table 2 sets forth the results of the shear scans at specific temperatures and shear rates, specifically: 50° C., 70° C., and 90° C. for shear rates of 2 s$^{-1}$ and 50 s$^{-1}$.

As demonstrated in Table 2, as the temperatures of the water-in-oil emulsions increase, their initial viscosities increase. However, the emulsions exhibit notable non-Newtonian shear-thinning behavior, becoming quite flowable under the action of relatively modest shear rate (i.e., 50 s$^{-1}$).

Demonstration of Ability to Provide Well-Specific Hydraulic Fracturing Fluids

Figure 2:
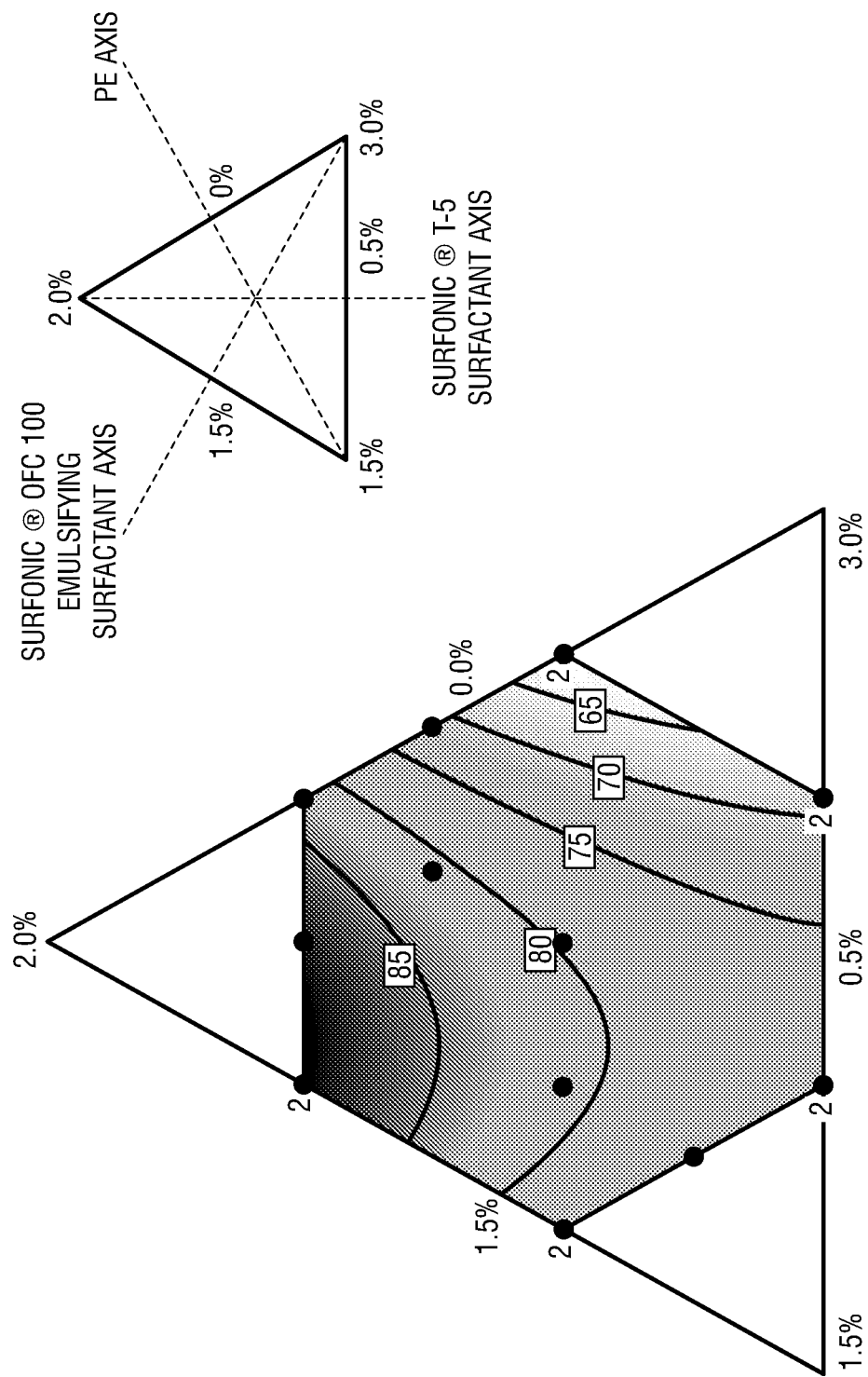
FIG. 2 is a ternary plot depicting the temperature required to reach 300 cP for water-in-oil emulsions containing various amounts of surfactants.

Ternary plots were generated for the data in Table 1. An exemplary plot is depicted in FIG. 2 for the data associated with the samples and requisite temperatures needed for each sample to reach a viscosity of 300 cP. Ternary plots associated with the temperatures needed for each sample to reach a viscosity of 200, 500, and 1000 cP are similar to the plot depicted in FIG. 2.

For FIG. 2, axis labels and values are described by the upper-right diagram. Individual samples are represented as points with duplicates denoted by the number "2". Boxed values give the temperature (° C.) associated with each contour line. The temperatures illustrated in the ternary plot range from 40 to 95° C. Low- and high-temperature regions are denoted with light and dark shading, respectively. Areas without shading fall outside the experimental matrix. As demonstrated by FIG. 2, the temperature increases with increasing concentrations of the SURFONIC® T-5 surfactant and decreases with increasing concentrations of the SURFONIC® OFC 100 emulsifying surfactant. The temperature appears to be somewhat independent of the concentration of PE.

Figure 3:
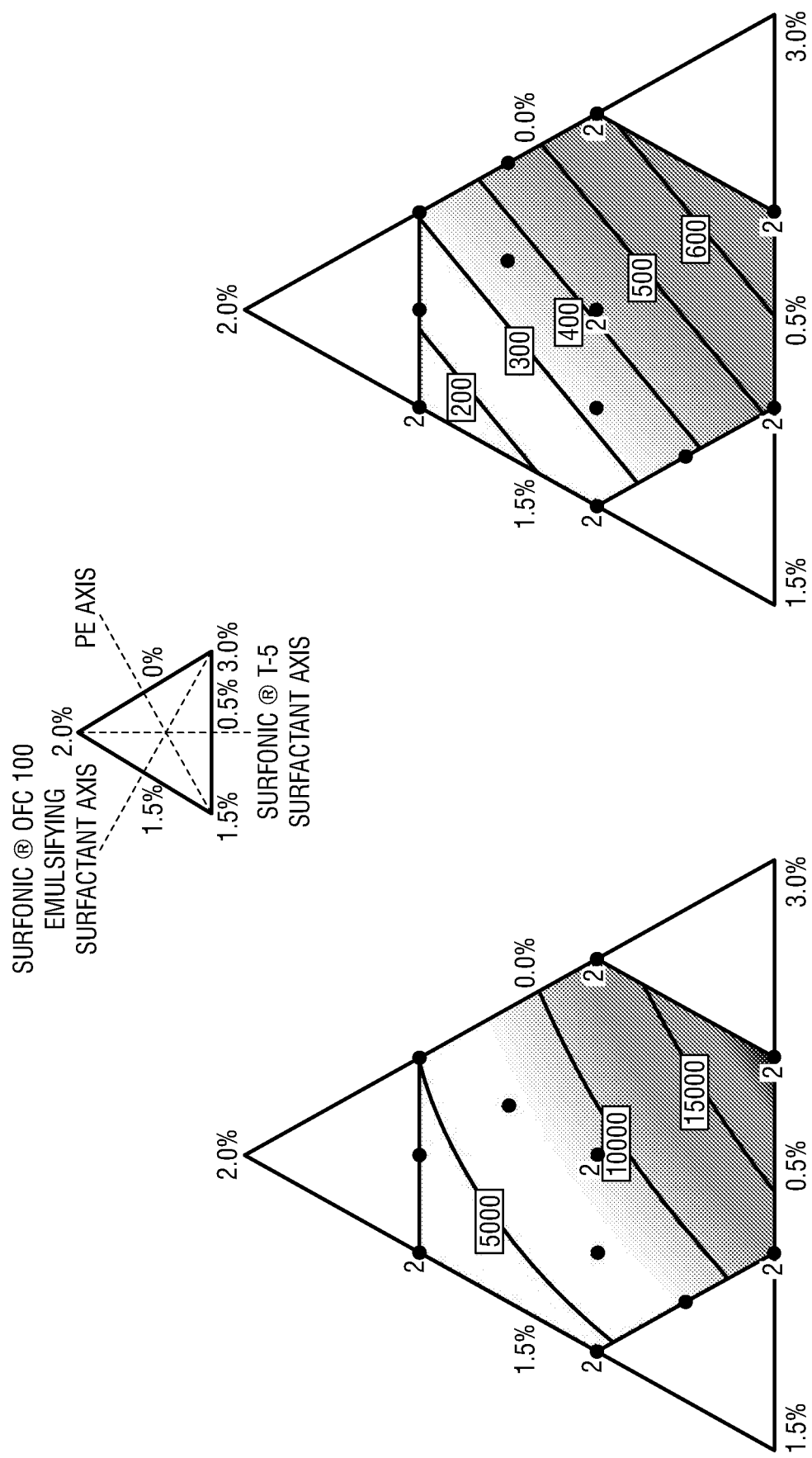
FIG. 3 is a pair of ternary plots depicting the viscosities of various water-in-oil emulsions at 70° C. and a shear rate of 2 $s^{-1}$ (left) and 50 $s^{-1}$ (right).

Example ternary plots were also generated using the viscosity data at 70° C. in Table 2 (FIG. 3). Although not shown, ternary plots using the viscosity data pertaining to other temperatures and shear rates appear similar albeit with different values.

Referring to FIG. 3, ternary plots of the viscosities measured at 70° C. for shear rates of 2 s$^{-}$ (left) and 50 s$^{-1}$ (right) are shown. Axis labels and values are described by the upper center diagram. Individual samples are represented as points with duplicates denoted by the number "2". Boxed values give the viscosities (cP) associated with each contour line. The viscosities illustrated in the ternary plot on the left range from 1000 to 22,500 cP and the viscosities illustrated in the ternary plot on the right range from 100 to 900 cP. Low- and high-viscosity regions are denoted with light and dark shading, respectively, although their associated values are different for each plot. Areas without shading fall outside the experimental matrix. As demonstrated by FIG. 3, the viscosity decreases with increasing concentrations of the SURFONIC® T-5 surfactant and increases with increasing concentrations of the SURFONIC® OFC 100 emulsifying surfactant. The temperature appears to be somewhat independent of the concentration of PE.

As demonstrated by the data, if subterranean conditions are known, the concentration of the first surfactant (e.g., SURFONIC® T-5 surfactant) and the at least one secondary surfactant (e.g., SUROFNIC® OFC 100 emulsifying surfactant) can be adjusted to obtain a requisite viscosity for the conditions. As such, a well-specific hydraulic fracturing fluid can be produced.

Examples of Converting Water-in-Oil Emulsion to Oil-in-Water Emulsion and Vice Versa A water-in-oil emulsion representative of Sample No. 18 in Table 1 was prepared as described above comprising 82 wt % brine, 14 wt % Isopar™ M fluid, 0.5 wt % lime, 1.5 wt % SURFONIC® T-5 surfactant, 1.75 wt % SURFONIC® OFC 100 emulsifying surfactant, and 0.25 wt % PE. The water-in-oil emulsion was then aged at 75° C. for 16 hours after which the electrical stability in peak volts was measured to be 650 V.

Various acids were individually added to aliquots of the aged water-in-oil emulsion followed by shaking. In each case, a low viscosity (~1 to 2 cP) fluid was obtained having electrical stability measurements indicative of an oil-in-water emulsion. In other words, the water-in-oil emulsion was "broken" by the acid, resulting in an oil-in-water emulsion. The individual acids and amounts of each added to the above-described aged water-in-oil emulsion are set forth in Table 3 along with their electrical stabilities.

TABLE 3

| Acid | Amount Added (wt %) | Electrical Stability (V) |
|---|---|---|
| Lactic acid | 0.7 | 1 |
| Acetic acid | 0.5 | 1 |
| Sulfuric acid | 1.0 | 1 |
| Nitric acid | 1.4 | 1 |
| Phosphoric acid | 0.9 | 1 |

Additionally, aliquots of several formulations from samples 1-18 as set forth in Table 1 were "broken" (i.e., converted to oil-in-water emulsions) by addition of acetic acid. In each case, stable, viscous water-in-oil emulsions could be re-created by adding lime and SURFONIC® OFC 100 emulsifying surfactant in an amount equal to that used in the original formulation, and aging for 16 hours at 75° C. While the addition of fresh SURFONIC® T-5 surfactant or PE was not necessary, it was not possible to re-create emulsions with properties similar to their originals without the addition of fresh SURFONIC® OFC 100 emulsifying surfactant. Without intending to be bound to a particular theory, it is thought the additional SURFONIC® OFC 100 is needed because the imidazoline undergoes hydrolytic ring-opening in acidic environments to give the analogous amidoamine, from which the imidazoline cannot easily be reformed.

However, an additional water-in-oil emulsion was prepared in a similar manner as above except with 82 wt % brine, 14 wt % Isopar™ M fluid, 0.5 wt % lime, 1.3 wt % SURFONIC® T-5 surfactant, 0.4 wt % PE (defined above), and 1.8 wt % of a hydroxyalkyl carbamate (instead of SURFONIC® OFC 100 emulsifying surfactant) having the following structure:

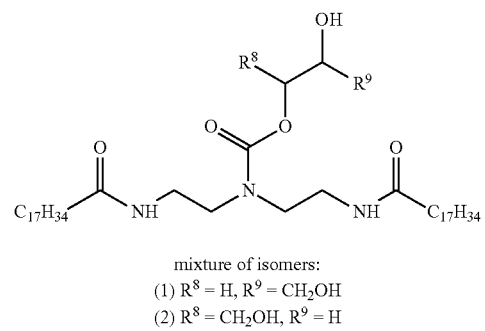

mixture of isomers:
(1) $R^8 = H, R^9 = CH_2OH$
(2) $R^8 = CH_2OH, R^9 = H$

The water-in-oil emulsion comprising the hydroxyalkyl carbamate was aged for 16 hours at 75° C. and then converted to an oil-in-water emulsion using acetic acid. The oil-in-water emulsion containing the hydroxyalkyl carbamate was reformed using only lime and did not require any additional hydroxyalkyl carbamate or other surfactant.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

What is claimed is:

1. A hydraulic fracturing fluid for treating subterranean formations comprising a water-in-oil emulsion comprising an aqueous solution, an oil, and a first surfactant, wherein the first surfactant comprises:
a 4-mole or higher ethoxylate of a fatty amine represented by formula I:

wherein $R^1$ is a saturated or unsaturated, branched or straight chain, substituted or unsubstituted hydrocarbyl group having from 12 to 18 carbon atoms; and $X = -(CH_2-CH_2-O)_a-H$ and $Y = -(CH_2-CH_2-O)_b-H$, wherein a and b are each integers independently ranging from 2 to 15 and
an emulsifying surfactant comprising an imidazoline represented by formula V:

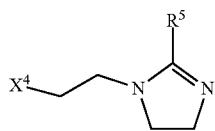

wherein $X^4$ is one of the following: —$NH_2$,

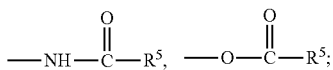

and $R^5$ is a saturated or unsaturated, branched or straight chain, substituted or unsubstituted hydrocarbyl group having from 9 to 17 carbon atoms.

2. The hydraulic fracturing fluid of claim 1, wherein the water-in-oil emulsion further comprises at least one secondary surfactant selected from:
(a) a second emulsifying surfactant comprising at least one of:
[[-an imidazoline represented by formula V:

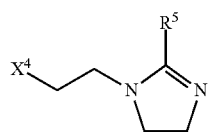

wherein $X^4$ is one of the following: —OH, —$NH_2$,

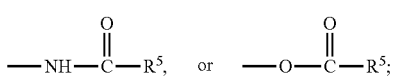

and $R^5$ is a saturated or unsaturated, branched or straight chain, substituted or unsubstituted hydrocarbyl group having from 9 to 17 carbon atoms;]]
an amidoamine represented by formula VI:

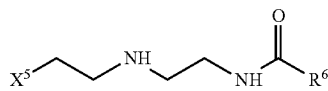

wherein $X^5$ is one of the following: —OH, —$NH_2$,

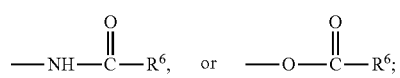

and $R^6$ is a saturated or unsaturated, branched or straight chain, substituted or unsubstituted hydrocarbyl group having from 9 to 17 carbon atoms; and
a hydroxyalkyl carbamate represented by formula VII:

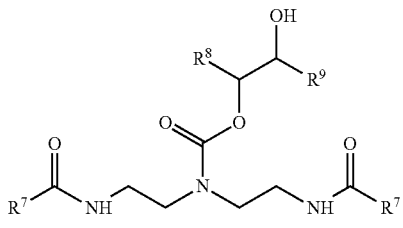

wherein $R^7$ is a saturated or unsaturated, branched or straight chain, substituted or unsubstituted hydrocarbyl group having from 9 to 17 carbon atoms, and each of $R^8$ and $R^9$ are one of the following: (i) $R^8=R^9=$—H, (ii) $R^8=$—H and $R^9=$—$CH_2OH$, (iii) $R^8=$—$CH_2OH$ and $R^9=$—H, (iv) $R^8=$—H and $R^9=$—$CH_3$, (v) $R^8=$—$CH_3$ and $R^9=$—H, (vi) $R^8=$—H and $R^9=$—$C_2H_5$, or (vii) $R^8=$—$C_2H_5$ and $R^9=$—H;
(b) a phosphate ester of ethoxylated alcohol or alkylphenol represented by structure IV:

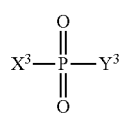

wherein $X^3 = -(O-CH_2-CH_2)_k-OR^4$, wherein k is an integer ranging from 1 to 20[[, or from 1 to 10, or from 1 to 6,]] and $R^4$ is a saturated or unsaturated, branched or straight chain, substituted or unsubstituted hydrocarbyl group having from 4 to 14 carbon atoms, alkylbenzene, or dialkylbenzene; and $Y^3=$—H or —$X^3$; or
(c) a combination thereof.

3. The hydraulic fracturing fluid of claim 2, wherein the water-in-oil emulsion comprises about 40 to about 90 wt % of the aqueous solution, about 5 to about 55 wt % of the oil, about 0.5 to about 3 wt % of the first surfactant, greater than 0 to about 3 wt % of the emulsifying surfactant, and greater than 0 to about 3 wt % of the phosphate ester of ethoxylated alcohol or alkylphenol, based on the total weight of the water-in-oil emulsion.

4. The hydraulic fracturing fluid of claim 2, wherein the at least one secondary surfactant comprises the phosphate ester of ethoxylated alcohol or alkylphenol represented by formula IV.

5. The hydraulic fracturing fluid of claim 4, wherein the water-in-oil emulsion comprises about 70 to about 90 wt % of the aqueous solution, about 0.5 to about 3 wt % of the first surfactant, greater than 0 to about 3 wt % of the emulsifying surfactant, and greater than 0 to about 3 wt % of the phosphate ester of ethoxylated alcohol or alkylphenol, based on the total weight of the water-in-oil emulsion.

6. The hydraulic fracturing fluid of claim 1, wherein the water-in-oil emulsion further comprises a pH modifier.

7. The hydraulic fracturing fluid of claim 6, wherein the pH modifier in the water-in-oil emulsion is present in an amount of from greater than 0 to about 2 wt %, based on the total weight of the water-in-oil emulsion.

8. The hydraulic fracturing fluid of claim 6, wherein the pH modifier is lime.

9. The hydraulic fracturing fluid of claim of claim 1, wherein the hydraulic fracturing fluid further comprises a proppant.

10. A method for fracturing a subterranean formation, comprising injecting the hydraulic fracturing fluid of claim 9 into a subterranean formation at a pressure sufficient to fracture the formation.

11. A method of fracturing a subterranean formation, the subterranean formation being in fluid communication with the surface of a well, the method comprising:
   a) injecting the hydraulic fracturing fluid of claim 9 into said well;
   b) pressurizing said hydraulic fracturing fluid so as to cause the subterranean formation to fracture and allow the proppant to enter said fractures; and
   c) adding acid to said hydraulic fracturing fluid so as to change the water-in-oil emulsion in the hydraulic fracturing fluid to an oil-in-water emulsion.

12. The method of claim 11, wherein at least a portion of said hydraulic fracturing fluid containing an oil-in-water emulsion is pumped out of the subterranean formation after step c).

13. The method of claim 12, wherein a base is added to said hydraulic fracturing fluid that has been pumped out of the subterranean formation so as to change the oil-in-water emulsion in the hydraulic fracturing fluid to a water-in-oil emulsion.

14. The method of claim 13, wherein the emulsifying surfactant is a hydroxyalkyl carbamate represented by formula VII:

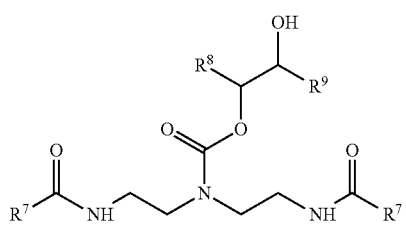

wherein $R^7$ is a saturated or unsaturated, branched or straight chain, substituted or unsubstituted hydrocarbyl group having from 9 to 17 carbon atoms, and each of $R^8$ and $R^9$ are one of the following: (i) $R^8=R^9=$—H, (ii) $R^8=$—H and $R^9=$—CH$_2$OH, (iii) $R^8=$—CH$_2$OH and $R^9=$—H, (iv) $R^8=$—H and $R^9=$—CH$_3$, (v) $R^8=$—CH$_3$ and $R^9=$—H, (vi) $R^8=$—H and $R^9=$—C$_2$H$_5$, or (vii) $R^8=$—C$_2$H$_5$ and $R^9=$—H.

15. The method of claim 14, wherein no additional surfactant is added with the base.

16. A hydraulic fracturing fluid for treating subterranean formations comprising a water-in-oil emulsion comprising an aqueous solution, an oil, and a first surfactant comprising a 4-mole or higher ethoxylate of a fatty amine represented by formula I:

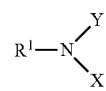

wherein $R^1$ is a saturated or unsaturated, branched or straight chain, substituted or unsubstituted hydrocarbyl group having from 12 to 18 carbon atoms; and

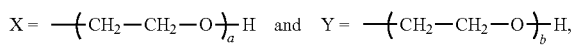

wherein a and b are each integers independently ranging from 2 to 15,
an emulsifying surfactant comprising an imidazoline represented by formula V:

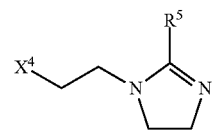

wherein $X^4$ is one of the following: —OH, —NH$_2$,

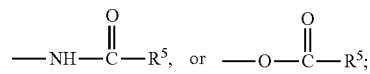

and $R^5$ is a saturated or unsaturated, branched or straight chain, substituted or unsubstituted hydrocarbyl group having from 9 to 17 carbon atoms, and
   a secondary surfactant comprising a phosphate ester of ethoxylated alcohol or alkylphenol represented by formula IV:

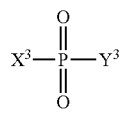

wherein

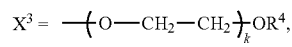

wherein k is an integer ranging from 1 to 20, and $R^4$ is a saturated or unsaturated, branched or straight chain, substituted or unsubstituted hydrocarbyl group having from 4 to 14 carbon atoms, alkylbenzene, or dialkylbenzene; and $Y^3$=—H or —$X^3$.

17. The hydraulic fracturing fluid of claim 16, wherein the water-in-oil emulsion further comprises a pH modifier.

18. The hydraulic fracturing fluid of claim 17, wherein the pH modifier is present in the water-in-oil emulsion in an amount greater than 0 to about 2 wt %, based on the total weight of the water-in-oil emulsion.

19. The hydraulic fracturing fluid of claim 18, wherein the pH modifier is lime.

20. The hydraulic fracturing fluid of claim 16, wherein the hydraulic fracturing fluid further comprises a proppant.

* * * * *